(12) United States Patent
Bloom et al.

(10) Patent No.: US 8,604,712 B2
(45) Date of Patent: Dec. 10, 2013

(54) LED LUMINAIRES POWER SUPPLY

(75) Inventors: John R. Bloom, Seattle, WA (US);
Walter M. Bloom, Warminster, PA (US);
Richard A. Frantz, Hatboro, PA (US);
Daniel J. Clark, Glenside, PA (US)

(73) Assignee: Keystone L.E.D. Holdings LLC, Warminster, PA (US)

( * ) Notice: Subject to any disclaimer, the term of this patent is extended or adjusted under 35 U.S.C. 154(b) by 147 days.

(21) Appl. No.: 13/078,077

(22) Filed: Apr. 1, 2011

(65) Prior Publication Data
US 2012/0043909 A1 Feb. 23, 2012

Related U.S. Application Data

(60) Provisional application No. 61/374,587, filed on Aug. 17, 2010.

(51) Int. Cl.
*H05B 37/02* (2006.01)
*H05B 41/16* (2006.01)

(52) U.S. Cl.
USPC ................... 315/294; 315/246; 315/155

(58) Field of Classification Search
CPC ...... H05B 33/089; Y02B 20/386; F21K 9/00; F21V 23/0442
USPC .......... 315/155, 158, 194, 209 R, 291, 246, 315/247, 294, 307, 360
See application file for complete search history.

(56) References Cited

U.S. PATENT DOCUMENTS

| | | | | |
|---|---|---|---|---|
| 7,311,423 | B2 * | 12/2007 | Frecska et al. | 362/372 |
| 8,203,277 | B2 * | 6/2012 | Grotkowski et al. | 315/246 |
| 8,299,711 | B2 * | 10/2012 | Chang | 315/41 |
| 2010/0289428 | A1 * | 11/2010 | Frazier et al. | 315/294 |
| 2011/0043137 | A1 * | 2/2011 | Negley et al. | 315/297 |
| 2011/0310614 | A1 * | 12/2011 | Budike, Jr. | 362/294 |

* cited by examiner

*Primary Examiner* — Vibol Tan
(74) *Attorney, Agent, or Firm* — Douglas J. Ryder; Ryder, Lu, Mazzeo & Konieczyn, LLC (57) ABSTRACT

An LED luminaires power supply that isolates dangerous line power from the LED luminaires. The power supply's footprint may enable retrofitting in existing lighting fixtures (e.g., replace ballast in florescent tube troffer). The power supply may individually power a plurality of LED luminaires based on power requirements of the individual LED luminaires. The power supply may receive and interpret TRIAC dimmer signals and/or other lighting protocol commands and provide dimming and/or other lighting scenarios to the LED luminaires. The power supply may include identification readers to read identification and/or power requirements for the LED luminaires being powered thereby (stored in luminaires or in adapters connected to luminaires). The LED luminaires driven by the power supply may include individual lighting fixtures (e.g., LED tubes, LED bulbs), a plurality of LED light arrays in a single light fixture (e.g., LED street lights, LED high hats), or some combination thereof.

27 Claims, 6 Drawing Sheets

LED LUMINAIRES POWER SUPPLY

PRIORITY

This application claims the priority under 35 USC §119 of Provisional Application 61/374,587 entitled "Light Emitting Diode (LED) Tube and Power Supply for T8 Light Fixtures" filed on Aug. 17, 2010. Application 61/374,587 is herein incorporated by reference in its entirety but is not prior art.

BACKGROUND

Light emitting diodes (LEDs) are an efficient source of light. By utilizing a plurality of LEDs in a defined arrangement, the LEDs may be utilized to provide an alternative to current luminaires, such as incandescent bulbs and fluorescent tubes. In order for LED luminaires (e.g., bulbs, tubes, fixtures) to be widely adapted they need to be able to replace current luminaires (e.g., incandescent bulbs, fluorescent tubes) in existing lighting configurations (LED bulbs or tubes need to be retrofitted in the existing lighting configurations).

Figure 1:
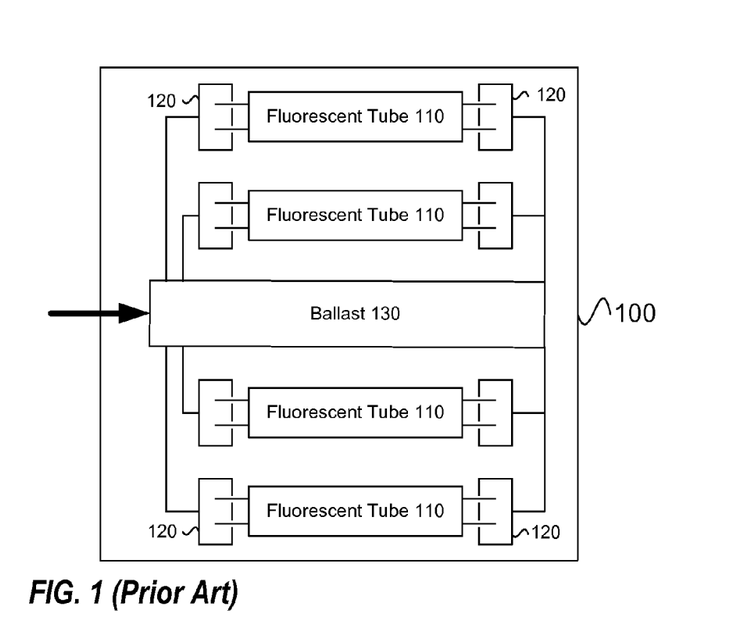
FIG. 1 illustrates a high level functional diagram of an example troffer commonly used to provide fluorescent lighting in commercial establishments.

FIG. 1 illustrates a high level functional diagram of an example troffer 100 commonly used to provide fluorescent lighting in commercial establishments (e.g., office buildings, retail stores, apartment complexes, hotels). The troffer 100 includes a housing (not separately identified in the figure) that is typically located in the ceiling and houses a plurality of fluorescent tubes 110 (four illustrated). The troffer 100 includes clips 120 that are utilized to hold the fluorescent tubes 110 and to provide the appropriate power thereto. The tubes 110 need a high initial voltage to begin operation (lighting) and then require a constant current to operate. Accordingly, the troffer 100 includes a ballast 130 that receives the line power (e.g., 120V, 240V) for the establishment and provides an initial striking voltage to the tubes 110 to initiate operation and then maintains a constant current to the tubes 110. The troffer 110 includes wires incorporated therein (not illustrated) that connect the ballast 130 to the clips 120.

A retrofitted LED tube needs to have the same, substantially the same, or similar footprint and form factor (hereinafter, for ease, simply referred to as same footprint) to be able to replace the florescent tube 110 in the troffer 100. However, the power requirements for an LED tube are different than the power requirements for florescent tubes 110. The ballast 130 used with florescent tubes 110 is not capable of providing the power requirements of the LED tubes and is typically removed, disconnected, or deactivated (simply referred to hereinafter as removed for convenience) in retrofits. A power supply/driver is required to convert the line power to the appropriate power requirements of the LED tubes. Often retrofit LED tubes use individualized power supplies built into each tube and each tube is directly connected to the line power.

Figure 2:
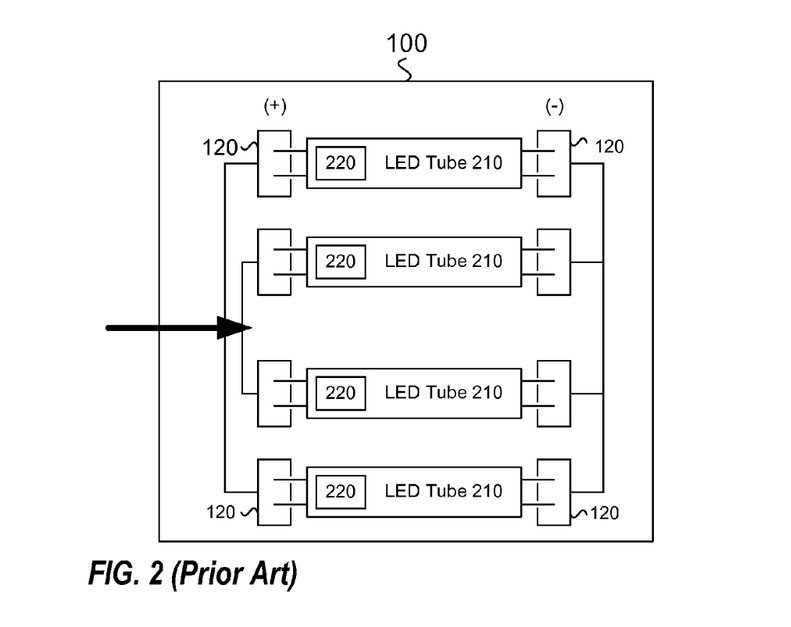
FIG. 2 illustrates a high level functional diagram of the example troffer of FIG. 1 with example retrofitted LED tubes.

FIG. 2 illustrates a high level functional diagram of the example troffer 100 of FIG. 1 with example retrofitted LED tubes 210. The LED tubes 210 include individualized power supplies 220 therewithin. The line power is provided directly to the LED tubes 210 via the clips 120 as the ballast 130 was removed (the wires incorporated in the troffer that typically are used to connect the clips 120 to the ballast 130 are connected directly to the line power). The power supplies 220 convert the line power to the necessary power requirements of the LED tubes 210.

Requiring the ballast 130 to be removed and connecting the line power directly to the clips 120 adds to the labor costs of retrofitting the light troffers 100 with LED tubes 210. This operation may require skilled professionals (e.g., electricians) and may pose a safety hazard as contact with the line power may occur. Furthermore having the line power on the clips 120 may propose a hazard when the LED tubes 210 are replaced as an installer may inadvertently contact the line power.

Including the power supply 220 within the LED tube 210 limits the design parameters (e.g., size, configuration) associated therewith. Most built-in power supplies are low quality and typically fall far short in terms of safety and reliability. Furthermore, they are brittle and delicate making them prone to damage with regular shipping and handling. The cost of assembly and labor to include the power supply 220 within the LED tubes 210 is an additional hindrance. In addition, encapsulating the power supply 220 within the tube 210 generates additional unnecessary heat that is trapped therewithin. This additional heat adversely affects the LEDs themselves, altering color temperature and shortening their expected lifespan. Moreover, the power supply 220 may have a life span less then that of the LEDs and thus be the limiting factor in the life of the LED tubes 210.

Incandescent luminaires may be dimmed using a TRIAC dimmer that is typically used in place of an on/off switch. The TRIAC dimmer is designed to operate only when connected to a resistive incandescent load, which LED luminaires are not. The TRIAC dimmer in effect reduces the net energy applied to the incandescent luminaires and therefore reduces the light output. The operation of an LED is controlled by adjusting the current, as long as there is a sufficient voltage across the diode (between the anode and cathode). Even if TRIAC dimmers could function with LED luminaires, current power supplies and/or electronics associated with LED luminaires do not detect voltage changes caused by the TRIAC dimmer and therefore would not correctly modify the current based thereon in order to provide dimming.

What is needed is an external power supply for powering LED luminaires. The power supply should be rugged and dependable. The power supply may include useful and innovative features that make the LED retrofit safer as well as more robust and efficient. According to one embodiment, the power supply should isolate the dangerous line power from the LED luminaires (e.g., fixtures, bulbs, tubes, arrays). According to one embodiment, the power supply should have a footprint that makes retrofitting in an existing lighting system as simple as possible. According to one embodiment, the power supply should be capable of powering a plurality of LED luminaires (each LED luminaire possibly being powered individually). According to one embodiment, the power supply may be able to receive a line voltage as modified by a TRIAC dimmer or other dimming protocols and be able to drive the LED luminaires in such a fashion as to provide dimming.

BRIEF DESCRIPTION OF THE DRAWINGS

The features and advantages of the various embodiments will become apparent from the following detailed description in which.

DETAILED DESCRIPTION

The main objectives for retrofitting current luminaires (e.g., incandescent, fluorescent) with LED luminaires is to conserve power (and thus save money) and to make the transition as easy and inexpensive as possible. Aside from material costs for the LED luminaires and the necessary power supply, the end user must take installation labor into consideration. Electricians who are familiar with the example troffers 100 are used to replacing fluorescent tubes and light ballasts. Making the installation of LED tubes and the necessary power supplies in the example troffers 100 as similar as possible to what the electricians are familiar with will ease the transition.

Figure 3:
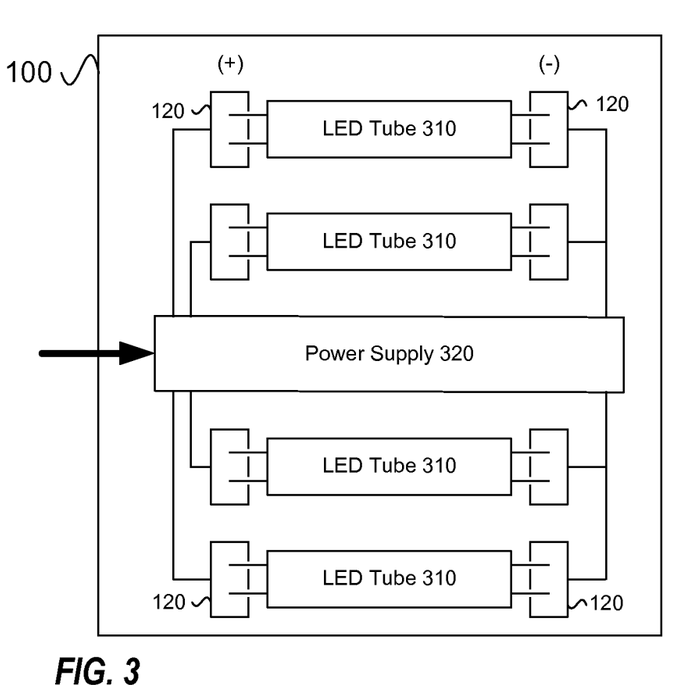
FIG. 3 illustrates a high level functional diagram of the example troffer of FIG. 1 with example retrofitted LED tubes and an external power supply, according to one embodiment.

FIG. 3 illustrates a high level functional diagram of the example troffer 100 of FIG. 1 with example retrofitted LED tubes 310 and a power supply (electronic switching) 320. The power supply 320 receives the line power from the power grid for the establishment (e.g., office building) and converts the line power to the appropriate power required to operate the LED tubes 310. The power may be provided to the LED tubes 310 as a constant voltage or a constant current. As LEDs may function better with the application of a constant current the description that follows will focus thereon.

According to one embodiment, the power supply 320 may be designed to have same, substantially the same, or similar footprint and form factor (hereinafter, for ease, simply referred to as same footprint) as the ballast. The power supply 320 may then be installed in the same location in the troffer 100 and in the same fashion. The power supply 320 may have the same input/output connections (e.g., same number and type of wires) to connect to the line power and the clips 120 (or wires within the troffer 100 connecting to the clips 120) in the same manner. The same footprint power supply 320 enables retrofitting with no, or substantially no, additional training or equipment required as it becomes intuitive and quick for the personnel (e.g., electrician) doing the job.

The power supply 320 should be rugged and dependable. Furthermore, as the safety of any individual interacting with the LED tubes 310 and/or power supply 320 is a priority the power supply 320 should include safety features. For example, isolating the LED tubes 310 and the power supply 320 from the incoming lethal line voltage could prevent the safety hazard poised by the potential of having a user inadvertently come in contact therewith. The power supply 320 may include an isolation design that separates the main power line from the LED tubes 310 and any necessary leads (e.g., clips 120) that somebody performing maintenance within the troffer 100 would be exposed to. In addition, the power supply 320 may include useful and innovative features that make the LED retrofit more robust and efficient (discussed in more detail later).

Figure 4:
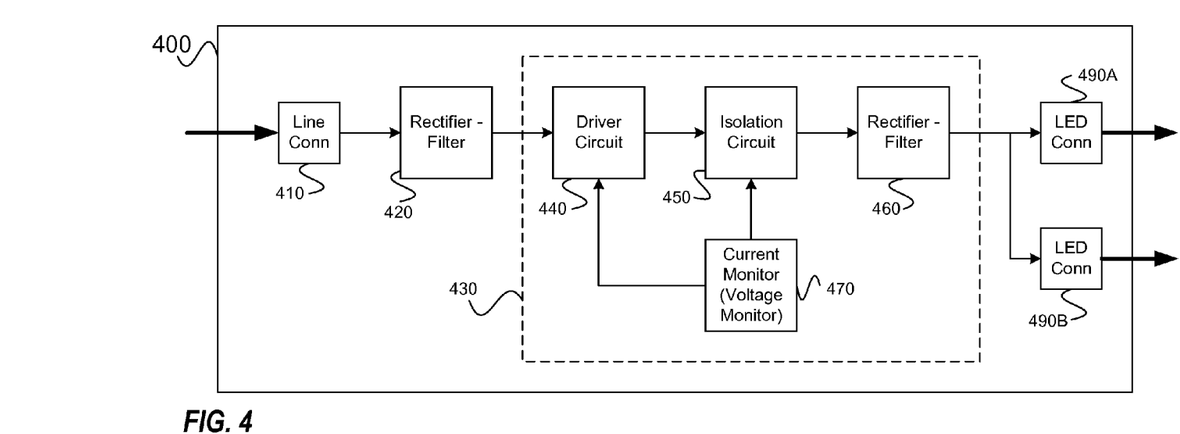
FIG. 4 illustrates a high level functional diagram of an example electronic switching power supply for driving LED luminaires, according to one embodiment.

FIG. 4 illustrates a high level functional diagram of an example electronic switching power supply 400 (e.g., 320 of FIG. 3). The power supply 400 includes a line connector 410, a rectifier/filter 420, a supply and control circuit 430, and one or more (two illustrated) LED connectors 490A, B. The line connector 410 receives the line power from the establishment. The line connector 410 may include a plurality of wires to connect to wires providing the line power to the troffer (similar to how a ballast is now connected). The rectifier/filter 420 rectifies the current from the line to flow in one direction and may additionally regulate the signal to a steady state value (or it could leave it as a full-wave rectified signal). The rectifier/filter 420 may filter out any noise from the line.

The supply and control circuit 430 includes a driver circuit 440, an isolation circuit (e.g., opto-isolator, transformer) 450, a rectifier/filter 460, and current (and possibly voltage) monitoring circuitry 470. The driver circuit 440 may slice or switch the received voltage into small slices so that the signal can be transmitted efficiently across the isolation circuit 450. The alternating current (AC) of the slices induces electricity on the secondary windings of the isolation circuit 450. The AC frequency of the slices determines the amount of current that will flow through the LED luminaires (e.g., fixtures, bulbs, tubes, arrays) being powered thereby. The driver circuit 440 may be programmed based on various parameters including parameters related to the power supply it is utilized in and LED luminaires it will be powering. The driver circuit 440 may also be used for power factor correction to ensure the power supply 400 meets energy efficiency standards.

The isolation circuit 450 steps-down the energy from the driver circuit 440 and may convert the energy to the energy necessary to operate the LED luminaires (e.g., 120V to 30V). Alternatively, other circuitry (not illustrated) may be used to convert (e.g., further step-down) the energy to the level required by the LED luminaires. The isolation circuit 450 isolates the line power from the connectors for receiving the LED luminaires (e.g., clips in the troffer) so as to prevent inadvertent contact with the line power. The rectifier/filter 460 converts the AC voltage to a DC voltage and filters out any noise. The LED connectors 490A, 490B provide the appropriate power to the LED luminaires. Each of the LED connectors 490A, 490B may include one or more wires to connect to the LED luminaires or connectors for receiving the LED luminaires. For example, the LED connectors 490A, 490B (wires) may connect to the wires incorporated in the troffer that connect to the clips that secure the tubes and provide the power thereto (similar to how a ballast is connected to the clips within a troffer).

The current monitoring circuitry 470 may monitor current through the LED luminaires indirectly (by measuring the frequency of the AC signal) on the primary side of the isolation circuit 450. The current monitoring circuitry 470 provides feedback (e.g., reference signal associated with the measured current) to the driver circuit 440 which adjusts the frequency of the AC voltage (corresponding to current) to increase or decrease the current accordingly. Voltage monitoring circuitry (illustrated as part of 470) may monitor voltage across the LED luminaires by measuring the voltage drop across the primary side of the isolation circuit 450 to ensure the LED luminaires voltage doesn't reach dangerous levels. The monitored LED luminaires voltage may be provided to the driver circuit 440 and the driver circuit 440 may make adjustments taking this measurement into account as well.

Figure 5:
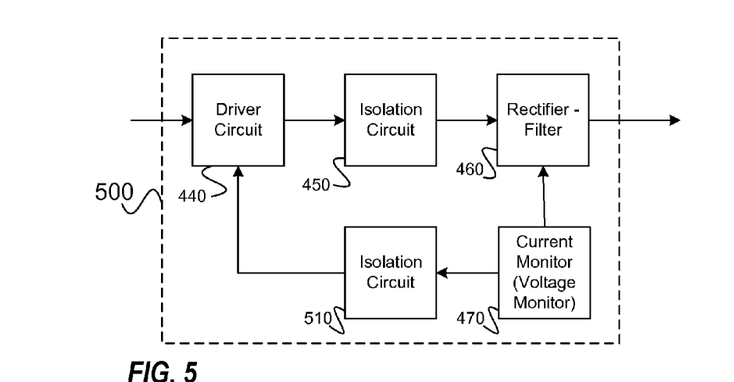
FIG. 5 illustrates a high level functional diagram of an example supply and control circuit used in the electronic switching power supply of FIG. 4, according to one embodiment.

FIG. 5 illustrates a high level functional diagram of an example supply and control circuit 500 (alternative embodiment to 430 of FIG. 4). Like the supply and control circuit 430, the supply and control circuit 500 includes the driver circuit 440, the isolation circuit (e.g., opto-isolator, transformer) 450, the rectifier/filter 460, and the current (and possibly voltage) monitoring circuitry 470. The current monitoring circuitry 470 may monitor LED luminaires current by measuring the current provided to the LED connectors (e.g., at the rectifier/filter 460). Voltage monitoring circuitry (illustrated as part of 470) may monitor the LED luminaires voltage by measuring the voltage drop across the rectifier/filter 460 to ensure the LED luminaires voltage doesn't reach dangerous levels. The current monitoring circuitry 470 provides feedback (e.g., reference signal associated with the measured current, measured voltage) to the driver circuit 440, possibly via a second isolation circuit 510 that adjusts the feedback. The driver circuit 440 may adjust the frequency of the AC voltage (corresponding to current) to increase or decrease the current accordingly.

If one or more of the LED luminaires (e.g., tubes in the troffer) is not installed, is not operating correctly, or has failed (hereinafter, for ease, simply referred to as a non-operational tube), there may be no current drawn by the non-operational LED luminaire(s) or the current through the non-operational LED luminaire(s) may be reduced (or possibly increased) so that the overall current measured by the current monitoring circuitry 470 is reduced (or increased). The driver circuit 440 may accordingly make adjustments that increase (or possibly decrease) the current provided to the LED luminaires. The adjustments made may result in the over (or under) powering of the operating LED luminaires which may affect their operation, reduce their lifespan and/or damage (possibly destroy) the LED luminaires. In order to prevent over (or under) powering of the operational LED luminaires, the power supply 400 may limit the adjustment range. However, powering LED luminaires that are non-operational is not efficient and is a waste of energy.

According to one embodiment, the power provided to each LED luminaire may be monitored and controlled individually so that if a determination is made that one (or more) of the LED luminaire(s) is non-operational (e.g., drawing no current), power to the non-operational LED luminaire(s) can be terminated without affecting the operation of the other LED luminaire(s).

Figure 6:
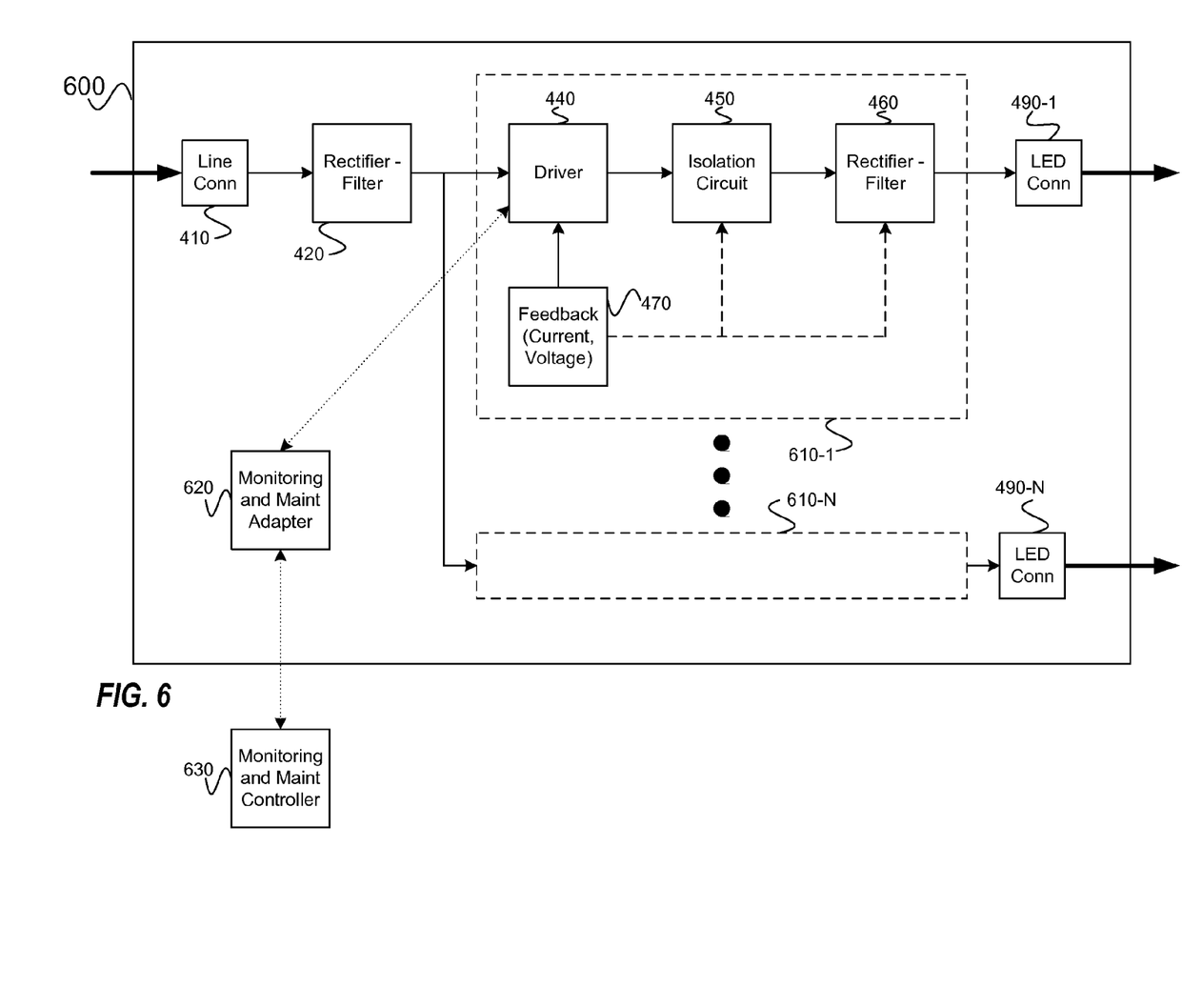
FIG. 6 illustrates a high level functional diagram of an example electronic switching power supply having a plurality of supply and control circuits, according to one embodiment.

FIG. 6 illustrates a high level functional diagram of an example power supply 600 having a plurality of supply and control circuits 610-1 through 610-N (contents only included for 610-1 for ease of illustration). Each supply and control circuit 610-1 through 610-N may monitor the current (and voltage) for an associated LED luminaire and control the application of the power to the associated LED luminaire individually. The current and voltage measurements 470 that are feedback to the driver 440 may be measured at various locations including the isolation circuit 450 and the rectifier 460. If the driver 440 associated with a certain LED luminaire (e.g., tube N) determines that the LED luminaire is non-operational (e.g., drawing no current), the supply and control circuit 610-N will not provide power to tube N while the other supply and control circuits 610-1 through 610-(N-1) will continue to supply power to the other LED luminaires (e.g., tubes 1 through N-1). This implementation prevents the inefficient use of power and dispersing power incorrectly to other LED luminaires (e.g., other tubes in the troffer). Incorporating this ability into the supply 600 will save the user money spent on power and will preserve the life of the LED luminaires by preventing over charging thus saving money on new LED luminaires.

According to one embodiment, the power supply 600 may have the ability to relay information related to its operation and/or the LED luminaires (e.g., non-operational, power consumption) it is powering to an external monitoring device. The power supply 600 may relay information at set intervals, when certain thresholds have been exceeded or certain conditions are detected (e.g., drawing less than a defined current, exceeding a defined voltage, no tube connected), or when requested. The information provided can be used to initiate a repair or replacement. The information may also be helpful in, for example, planning maintenance schedules, tracking inventory and ordering parts. According to one embodiment, the drivers 440 may be capable of relaying the information (be capable of wireless communications)

The power supply 600 may include a monitoring and maintenance adapter 620 that gathers information related to the operation thereof and reports the information to an external monitoring and maintenance controller 630. The monitoring and maintenance adapter 620 may be provided the information or may extract the information from the drivers 440. Alternatively, the information may be provided by or extracted from the feedback 470. It should be noted, that for ease of illustration, the monitoring and maintenance adapter 620 is only illustrated communicating with the supply and control circuits 610-1 (driver 440) but that each of the supply and control circuits 610 are capable of communicating therewith. Furthermore, it is possible that the power supply 600 includes a plurality of monitoring and maintenance adapters 620 (e.g., one for each driver 440).

The monitoring and maintenance adapter 620 may provide raw data or may organize the data and possibly create reports and provide the reports to the external monitoring and maintenance controller 630. The monitoring and maintenance adapter 620 is illustrated as being internal to the power supply 600 but could also be located external to the power supply 600 or could be a separate component (stand-alone or add-on adapter) that is integrated in some fashion with the power supply 600.

The monitoring and maintenance adapter 620 and the external monitoring and maintenance controller 630 may be capable of communicating wirelessly. The external monitoring and maintenance controller 630 may be, for example, a computer system (e.g., for monitoring and maintenance of a building), a stand-alone device (e.g., capable of interacting with the power supply), or a software application running on a computer or wireless device. The wireless device may be, for example, a media player (e.g., iPod Touch), a smart phone (e.g., iPhone, Blackberry, Android phone, Windows phone), a tablet computer (e.g., iPad), or a lap-top computer. The external monitoring and maintenance controller 630 provides maintenance personnel the ability to know what's going on in terms of their lighting and to be alerted and updated regarding potential issues (e.g. receive a text message that a certain tube is consuming zero (0) watts).

According to one embodiment, the external monitoring and maintenance controller 630 may be capable of requesting information from the power supply. For example, the external monitoring and maintenance controller 630 may request status information for the power supply 600 from the monitoring and maintenance adapter 620. The maintenance personnel may request this information at certain periods of time or for certain events (e.g., inventory, budgeting, scheduling). Furthermore, the external monitoring and maintenance controller 630 may be used to send commands to the monitoring and maintenance adapter 620 to control certain operations of the power supply 600. For example, if the maintenance personnel determine it is time to change a certain luminaire or if they decide to turn a certain luminaire off because, for example, it is flickering, they can send a command to ensure that the power supply 600 is not powering that luminaire.

The power supply 600 may be designed for a specific number of LED luminaires (e.g., 2, 4, 8) or may come with at least one supply and control circuit 610 (e.g., master) and have the ability to add additional supply and control circuits 610 (e.g., plug-in boards).

Figure 7:
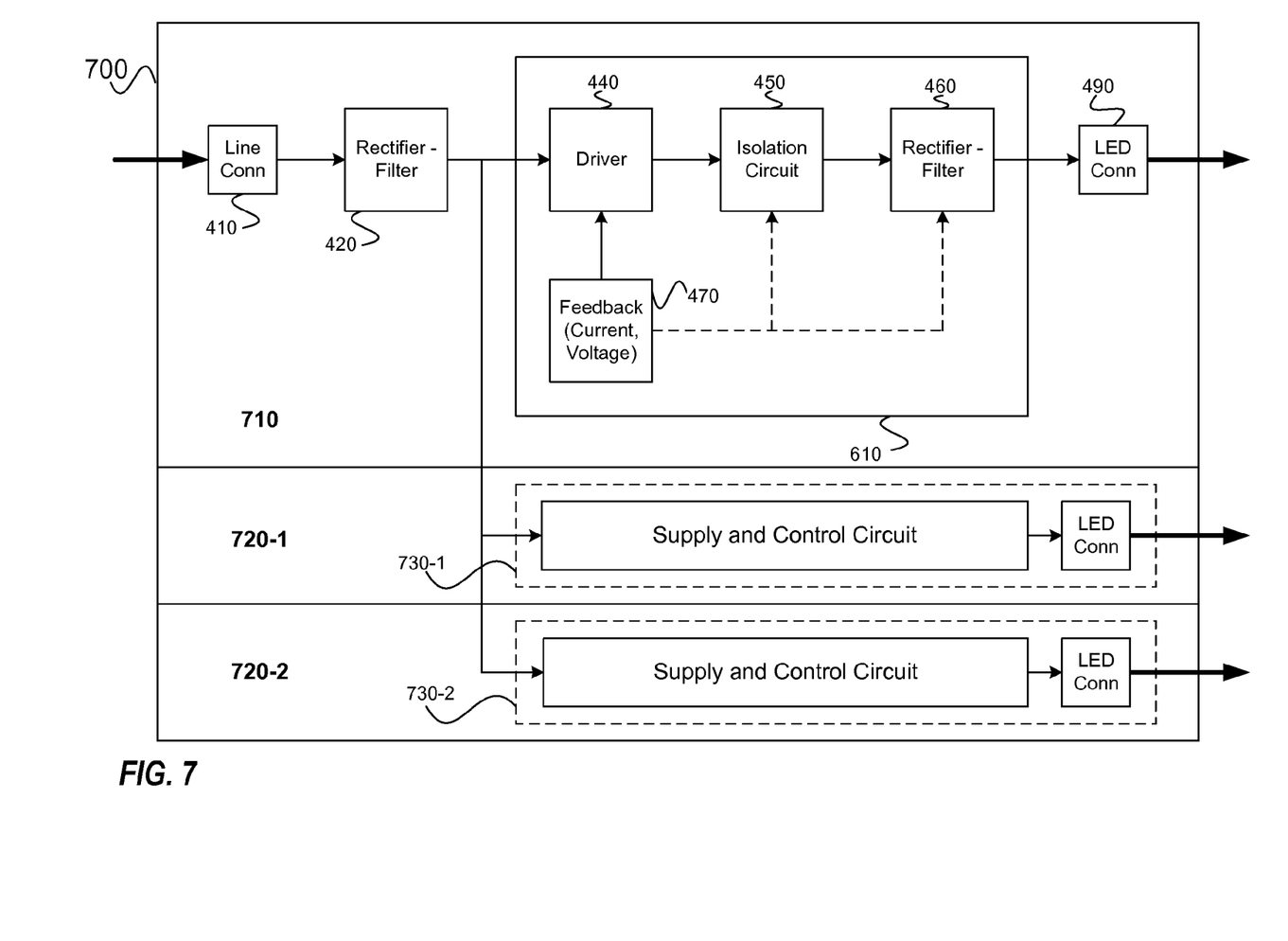
FIG. 7 illustrates a high level functional diagram of an example electronic switching power supply including expansion slots, according to one embodiment.

FIG. 7 illustrates a high level functional diagram of an example electronic switching power supply 700 including a main portion 710 and two expansion slots 720-1, 720-2. The main portion 710 includes one supply and control circuit 610 and one LED connector 490. The expansion slots 720-1, 720-2 are capable of receiving, for example, plug-in boards that include supply and control circuits and LED connectors. As illustrated, each expansion slot 720-1, 720-2 includes a plug-in board 730-1, 730-2 that includes one supply and control circuit and one LED connector. It should be noted that main portion 710 and the plug-in boards 730-1, 730-2 within the expansion slots 720-1, 720-2 are not limited to one supply and control circuit, one LED connector, or providing power to a single LED luminaire as illustrated. Rather, the main portion 710 could be designed to provide power to a plurality of LED luminaires (e.g., have a plurality of supply and control circuits and LED connectors) and the plug-in boards 730-1, 730-2 could also be designed to provide power to a plurality of LED luminaires.

TRIAC dimmers are typically connected to the incoming AC line power and are used to provide dimming in incandescent luminaires by reducing the net energy delivered thereto. The TRIAC dimmers are designed to operate only when connected to a resistive incandescent load. Furthermore, LED luminaires are not designed to operate with the line power. Accordingly, modifications to the power supplies that drive the LED luminaires are required to fool the TRIAC dimmers into believing they are connected to a resistive load and to interpret the TRIAC signals (e.g., reduced voltage) received into a corresponding current that will provide the desired dimming level.

Figure 8:
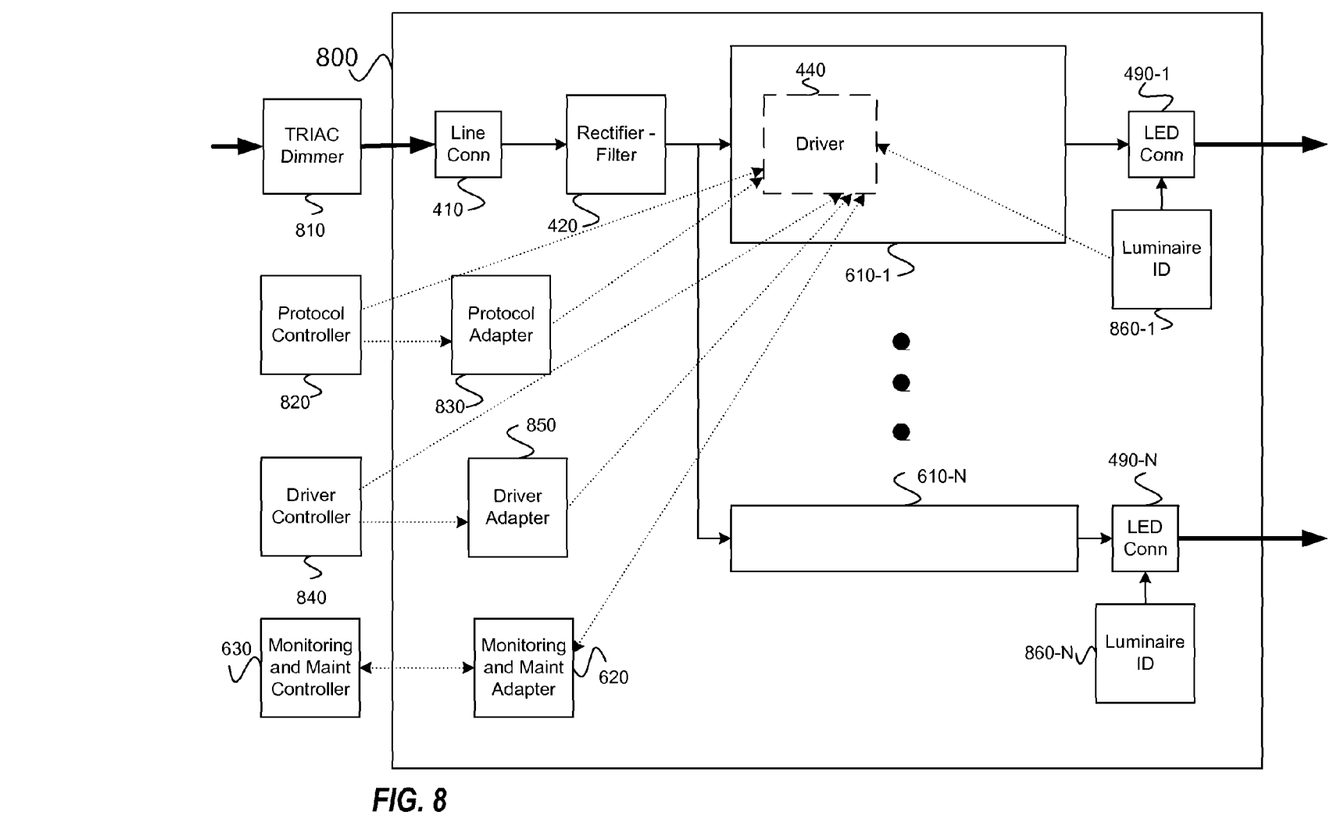
FIG. 8 illustrates a high level functional diagram of an example electronic switching power supply providing additional functionality (e.g., dimming, automatic configuration), according to one embodiment.

FIG. 8 illustrates a high level functional diagram of an example electronic switching power supply 800 providing additional functionality (e.g., dimming, automatic configuration). A TRIAC dimmer 810 may be located in series with the example power supply 800 and receive the line power and provide its output to the line connector 410 of the power supply 800. It should be noted that for ease of illustration, the contents of the plurality of supply and control circuits 610 is only illustrated for the driver 440 in supply and control circuits 610-1. The power supply 800 may include circuitry (not separately illustrated) to imitate to the TRIAC dimmer 810 that it is connected to a resistive incandescent load. The circuitry may receive the dimming signal (conduction angle) from the TRIAC dimmer 810 and feed it to the driver 440. The driver 440 may use the dimming signal as well as the feedback 470 to adjust switching speed so as to provide the appropriate current for the desired level of lighting (dimming). The dimming signals may be measured at the same locations where the current and voltage are monitored (e.g., on the primary side of the isolation circuit 450 as in FIG. 4, at the rectifier/filter 460 as in FIG. 5).

According to one embodiment, the power supply 800 may have one driver 440 operate as a master for dimming (e.g., driver 440 in supply and control circuits 610-1) while the other drivers act as slaves. In such an embodiment the drivers 440 would need to be connected in some fashion (not illustrated) to enable them to operate in a master-slave configuration. Each driver 440 would continue to make their own operational adjustments based on the feedback for the specific LED luminaires it is providing power. The master driver 440 would receive and interpret the TRIAC dimmer's conduction angle (e.g., 50% dimming) and provide a corresponding LED dimming signal (e.g., reference voltage) to the slave drivers 440. The master driver 440 and the slave drivers 440 would take the appropriate action based thereon (e.g., adjust switching speed to reduce current by 50%).

If the master driver 440 became non-operational due to its LED luminaires being non-operational, another driver 440 may take over as the master. According to one embodiment, each driver 440 may receive and interpret the TRIAC dimming signals on their own rather then operating in a master slave configuration.

The power supply 800 may also be capable of working with intelligent lighting systems to provide dimming and other lighting scenarios (e.g., different configurations of lights on) based on different parameters (e.g., timing, light sensing, motion sensing) programmed therein. The intelligent lighting systems may utilize protocol controllers 820 to provide the lighting scenarios (e.g., dimming, switching) to the power supply 800. The protocol controllers 820 may provide the lighting scenarios as standard (e.g., 0-10V analog) or custom protocol lighting commands. The driver(s) 440 may be capable of receiving the protocol commands from the protocol controllers 820 and controlling the current based thereon to provide the desired lighting. Alternatively, the power supply 800 may include lighting protocol interface adapters 830 that can receive the commands from the protocol controllers 820, interpret the commands, and provide the interpreted commands to the driver 440. According to one embodiment, the protocol controllers 820 may be capable of communicating wirelessly with the drivers 440 and/or the protocol interface adapters 830.

The driver(s) 440 may control the current provided to the LED luminaires to provide the desired lighting. The interface adapters 830 may translate standard, non-standard and/or custom lighting protocols into something that the driver 440 can understand, interpret and/or act on. The interface adapters 830 are illustrated as being internal to the power supply 800 but could also be located external to the power supply 800 or could be separate components (stand-alone or add-on adapters) that are integrated in some fashion with the power supply 800.

The drivers 440 may operate in a master slave configuration when processing commands from the protocol controllers 820. Alternatively each driver 440 may process the commands independently. Depending on the commands received from the protocol controllers 820, the drivers 440 may need to perform different tasks. For example, if the commands were to turn two of the four LED luminaires (e.g., two tubes in a four tube troffer) off, two of the drivers 440 would stop providing power to their associated LED luminaires while the other two would continue operating. It should be noted, that for ease of illustration, the commands from the protocol controllers 820 are only illustrated being provided to the driver 440 in supply and control circuits 610-1 (either directly or via the interface adapters 830).

According to one embodiment, dimming may be provided by turning the LEDs in the LED luminaires off for very short periods of time that are not visible to the human eye (pulse width modulation) rather then adjusting the current. The more often the LEDs are turned off, the dimmer the light provided by the LED luminaires.

LED luminaires are made by various manufacturers and the manufacturers may make various different models of the same device (tubes for use in the same troffer). The different manufacturers and/or the different models by the same manufacturer may have unique configurations of the number, arrangement and type of LEDs used. These variations can result in a fairly broad power spectrum for the same style LED luminaires (e.g., T8 tubes). Accordingly, if different tubes were used in the same troffer the power requirements for the tubes would be different. Applying the same power requirements to each tube may result in different color temperature and brightness level for the different tubes contained in the same troffer. In addition, applying the same power requirements is energy inefficient.

According to one embodiment, the individual drivers 440 may be manually programmed (configured) based on the power requirements of the associated LED luminaires connected thereto. As the LED luminaires may be changed after the power supply is configured and possibly installed, programming may not be a viable option unless the drivers 440 can be programmed remotely (e.g., wireless programming). The drivers 440 may be programmed using a driver controller 840. The driver controller 840 may enable a user (e.g., electrician) to enter the power requirements (e.g., 12 W) for particular LED luminaires being used. Alternatively, the driver controller 840 may enable the user to enter an LED luminaire identification (e.g., tube 1234) and the LED luminaire identification may be associated with the power requirements (e.g., tube 1234=12 W). In the LED luminaire identification embodiment, the association between the LED luminaire identification and the power requirements would have to be known (for example, stored in memory in the driver controller 840). The memory would have to be capable of being updated with new LED luminaire identifications and/or new power requirement associations.

According to one embodiment, the driver controller 840 may program the drivers 440 directly (e.g., if the drivers 440 are capable of wireless communications). According to one embodiment, the power supply 800 may include a driver adapter 850 that can receive the configuration (wirelessly), interpret the configuration if necessary, and provide the configuration to the driver 440. If the configuration provided to the driver adapter 850 was the LED luminaire identification, the driver adapter 850 may provide the association between the LED luminaire identification and the power requirements and the association may be stored in memory in the driver adapter 850. The memory would have to be capable of being updated with new LED luminaire identifications and/or new power requirement associations. It should be noted, that for ease of illustration, the configuration from the driver controller 840 is only illustrated being provided to the driver 440 in supply and control circuits 610-1 (either directly or via the driver adapter 850).

Rather then manually programming the power requirements into the drivers 440, the LED luminaires may include the power requirements programmed therein in some fashion and the power supply 800 may be capable of reading the power requirements therefrom and programming the associated driver 440 based thereon. The power requirements for the LED luminaires may be programmed in any number of devices including, but not limited to, radio frequency identification (RFID) chip, read only memory (ROM), passive components, or an impulse response trigger. The power requirements may not be limited to optimal operational power for the LED luminaires, but may include other information about the LED luminaires, including but not limited to, dimming profiles, color temperature, heat tolerance, LEDs, and array configuration. The power requirements should not be capable of being modified or overwritten after they are programmed/burned therein. The device that the power requirements are stored in may be designed as part of the LED luminaires (e.g., located on the board, located in the endcap). Alternatively, the device may be a separate plug-in adapter/module that can be connected to the LED luminaires in some fashion (e.g., internal, external).

According to one embodiment, the power supply 800 includes a LED luminaire identification reader 860-1, 860-N associated with each LED connection 490-1, 490-N that can detect power requirements and/or identification information related to LED luminaires connected thereto from the device on the LED luminaires containing the data. The LED luminaire identification reader 860-1, 860-N may include, but is not limited to, an RFID reader, a ROM interface, circuitry to read data from passive circuitry, and circuitry to activate an impulse response trigger. Once the LED luminaire identification reader 860-1, 860-N reads the power requirements and/or identification information, and interprets the information if necessary, it provides the information to the driver 440 for configuration thereof It should be noted, that for ease of illustration, only the communications between the LED luminaire identification reader 860-1 and the driver 440 in supply and control circuits 610-1 is illustrated. Furthermore, the LED luminaire identification readers 860-1, 860-N are illustrated as being internal to the power supply 800 but could also be located external to the power supply 800 or could be separate components (stand-alone or add-on adapters) that are integrated in some fashion with the power supply 800.

The reading of the LED luminaire identification/power requirements for the LED luminaires by the power supply may include a secure hand-shake between the devices. The secure hand-shake may ensure that the luminaire identification/power requirements are authentic, used a standard/licensed format and/or was provided by an approved/licensed manufacturer. The secure hand-shake may include encoding the LED luminaire identification/power requirements information. The LED luminaire identification/power requirements for each LED luminaire may be encrypted (e.g., using a private key) such that each luminaire has a unique identification (that may appear to be seemingly random) and is decrypted in the power supply using a known algorithm (e.g., public key) to determine the power requirements. The decoding/decryption functionality is not separately illustrated in the power supply 800 but could be performed by, for example, a processor (not illustrated).

The power supply 800 may include the monitoring and maintenance adapter 620 that communicates with the external monitoring and maintenance controller 630. In addition to the information previously discussed (operational parameters) as being provided to the external monitoring and maintenance controller 630 by the monitoring and maintenance adapter 620, information related to the luminaire ID, power requirements, and dimming protocols may also be provided. Furthermore, the external monitoring and maintenance controller 630 may be able to control the various functions related to reading luminaire identification and dimming.

It should be noted that the protocol interface adapter(s) 830, the driver controller 840, the LED luminaire identification readers 860-1, 860-N, and the monitoring and maintenance adapter 620 are illustrated as separate boxes (components) but in no way are intended to be limited thereby. Rather these boxes are simply meant to illustrate the functions that may be performed and not necessarily to indentify a unique component. It is possible that one or more components, such as a processor, may perform functions represented by multiple boxes. The power supply may include memory (not illustrated) that includes processor executable instructions that when executed by a processor cause the processor to perform portions of the functions described in the boxes.

According to one embodiment, the power supply may include a backup battery (not illustrated) that can be used to provide power during a power outage. The back-up battery may supply power to one or more LED luminaires during a power outage depending on the configuration of the power supply.

RF noise is a significant concern when dealing with lighting applications. The power supply should be able to compensate for that. In addition to being externally shielded with a metal ground casing, the supply needs to be able to tolerate frequency noise from the power grid. A heavy part of this noise can be attributed to the clocks of the many different drivers on the different power supplies through the line grid being out of sync. Therefore, a clock synchronization routine may be a feature of the power supply. The clock synchronization routine gives the power supplies the ability to run and synchronize off of the same clock frequency, with no phase or frequency issues.

It should be noted that the power supplies described above were described with specific reference to LED tubes and troffers. However, the power supply is in no way intended to be limited thereto. Rather the power supply could be utilized to drive other LED luminaires (lighting devices, tubes, bulbs, arrays). The other LED luminaires may come in various configurations including multiple luminaires (e.g., arrays) contained within a single device (e.g., street lights, high hats). The power supply may provide power individually to each of the arrays within the LED luminaire and the arrays may have different power requirements. The power supply may enable the LED luminaires to light (or dim) all or some portion of the arrays contained therewithin. Using this power supply in these LED luminaires provides the manufacturer thereof much more flexibility in the design thereof as the power supply is capable of individual powering based on the specific power requirements of each LED array contained therein. The power supply may be contained within the LED luminaires (e.g., street light) in a separate compartment from the LED arrays or may be separate from the LED luminaires and connected to the LED luminaires in some fashion.

According to one embodiment, the power supply may be provided in a housing that is weatherproof (e.g., can tolerate a wide temperature spectrum, is water resistant, is ultra violet (UV) resistant) and/or fire-resistant for those cases were the power supply may be located outside or in an area subject harsher conditions.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

What is claimed:

1. A power supply comprising:
a first connector to receive line power;
a plurality of supply and control circuits associated with a plurality of LED luminaires, wherein each of the plurality of LED luminaires has a power profile associated therewith, and wherein each of the plurality of supply and control circuits is to individually convert the line power to power necessary to drive an associated LED luminaire based on the power profile associated therewith; and
a plurality of second connectors to provide the necessary power to the associated ones of the plurality of LED luminaires.

2. The power supply of claim 1, wherein each supply and control circuit isolates the line power from an associated second connector.

3. The power supply of claim 1, wherein each supply and control circuit includes a driver to convert the line power into small slices, wherein frequency of the small slices is based on the power profile for an associated LED luminaire, wherein the frequency of the small slices determines current that will flow through the associated LED luminaire, and wherein each driver receives feedback related to the current flowing through the associated LED luminaire and makes necessary adjustments.

4. The power supply of claim 3, further comprising circuitry to imitate to a TRIAC dimmer used to adjust the line power that the TRIAC dimmer is connected to a resistive load, receive dimming signals from the TRIAC dimmer, and provide the TRIAC dimming signals to at least one driver, wherein the at least one driver interprets the TRIAC dimming signals and makes necessary adjustments to provide dimming.

5. The power supply of claim 4, wherein the circuitry provides the TRIAC dimming signals to a master driver and the master driver provides dimming instructions to the other drivers that act as slaves for dimming.

6. The power supply of claim 5, wherein the dimming instructions are a reference voltage.

7. The power supply of claim 3, further comprising a lighting protocol adapter to receive and interpret lighting protocol commands and provide the interpreted lighting commands to at least one driver and the at least one driver makes necessary adjustments.

8. The power supply of claim 1, further comprising at least one luminaire identification reader to read the power profile for an associated LED luminaire from the associated LED luminaire and provide the power requirements to an associated supply and control circuit.

9. The power supply of claim 1, further comprising at least one expansion slot to receive a plug-in card that includes one or more supply and control circuits and associated second connectors.

10. The power supply of claim 1, wherein a supply and control circuit may stop providing power to an associated LED luminaire if it determines the LED luminaire is non-operational.

11. The power supply of claim 1, wherein the plurality of associated luminaires are contained within a single light fixture.

12. The power supply of claim 1, wherein the plurality of associated luminaires includes a plurality of LED tubes having substantially same form factor as fluorescent tubes utilized in fluorescent light troffers and the power supply has substantially same form factor as a ballast used to provide power the florescent tubes.

13. The power supply of claim 1, further comprising a monitoring and maintenance adapter to communicate with an external monitoring and maintenance entity regarding operation of the power supply and the luminaires.

14. A power supply comprising:
a first connector to receive line power;
a supply and control circuit to convert the line power to a power profile for an LED luminaire to be powered by the power supply;
a second connector to provide the power profile to the LED luminaire; and
an identification reader to read the power profile for the LED luminaire from the LED luminaire and provide the power profile to the supply and control circuit.

15. The power supply of claim 14, wherein the supply and control circuit includes a driver to convert the line power into small slices where frequency of the small slices is based on the power profile for the LED luminaire, wherein the frequency determines current that will flow through the LED luminaire, and wherein the driver receives feedback related to the current flowing through the LED luminaire and makes necessary adjustments.

16. The power supply of claim 15, wherein the first connector is to receive the line power via a TRIAC dimmer, and further comprising circuitry to imitate to the TRIAC dimmer that it is connected to a resistive load, receive dimming signals from the TRIAC dimmer, and provide the TRIAC dimming signals to the driver, wherein the driver interprets the TRIAC dimming signals and makes necessary adjustments to provide dimming.

17. The power supply of claim 15, further comprising a lighting protocol adapter to receive and interpret lighting protocol commands and provide the interpreted lighting commands to the driver, wherein the driver makes necessary adjustments, wherein the lighting protocol commands include dimming.

18. The power supply of claim 14, further comprising at least one expansion slot to receive a plug-in card that includes one or more supply and control circuits, associated second connectors and associated identification readers.

19. The power supply of claim 14, wherein the power profile includes at least some subset of optimal operational power, dimming profiles, color temperature, heat tolerance, LEDs, and array configuration.

20. The power supply of claim 14, wherein the identification reader is an RFID reader.

21. The power supply of claim 14, wherein the identification reader is a ROM interface.

22. The power supply of claim 14, wherein the identification reader includes circuitry to read the power profile from the luminaire, wherein the power profile may be stored in passive circuitry, active circuitry or an impulse response trigger on the luminaire.

23. The power supply of claim 14, further comprising a monitoring and maintenance adapter to communicate with an external monitoring and maintenance entity regarding operation of the power supply and the luminaire.

24. A power supply comprising:
a first connector to receive line power via a TRIAC dimmer;
circuitry to imitate to the TRIAC dimmer that it is connected to a resistive load;
a plurality of supply and control circuits to individually provide power to LED luminaires connected thereto that are operational, wherein each supply and control circuit is to convert the line power to a power profile for an associated LED luminaire, wherein each supply and control circuit includes a driver to convert the line power into small slices where frequency of the small slices is based on the power profile for the associated LED luminaire and the frequency determines current that will flow through the associated LED luminaire, wherein each driver receives feedback related to the current flowing through the associated LED luminaire and makes necessary adjustments, and wherein at least one driver receives dimming signals from the TRIAC dimmer, interprets the TRIAC dimming signals and makes necessary adjustments to provide dimming;
a plurality of second connectors to provide the power profile to the associated LED luminaires; and
a plurality of identification readers to read the power profile for the associated LED luminaires from the associated LED luminaires and provide the power profile to the associated driver.

25. The power supply of claim 24, further comprising a lighting protocol adapter to interface with an intelligent lighting system, wherein the lighting protocol adapter is to receive lighting protocol commands from the intelligent lighting system, interpret the lighting protocol commands, and provide the interpreted commands to at least one driver, wherein the at least one driver is to make necessary adjustments to implement the lighting protocol commands.

26. The power supply of claim 24, further comprising at least one expansion slot to receive a plug-in card that includes one or more supply and control circuits, associated second connectors and associated identification readers.

27. The power supply of claim 24, further comprising a monitoring and maintenance adapter to communicate with an external monitoring and maintenance entity regarding operation of the power supply and the luminaires.

* * * * *